United States Patent

[11] 3,582,713

[72] Inventor James Peter Till
Camp Hill, Pa.
[21] Appl. No. 019,567
[22] Filed Mar. 16, 1970
[45] Patented June 1, 1971
[73] Assignee AMP Incorporated
Harrisburg, Pa.

[54] OVERCURRENT AND OVERVOLTAGE PROTECTION CIRCUIT FOR A VOLTAGE REGULATOR

6 Claims, 3 Drawing Figs.

[52] U.S. Cl. .......... 317/31, 323/20, 317/33
[51] Int. Cl. .......... H02h 3/20, G05f 1/58
[50] Field of Search .......... 317/31, 33; 323/20, 22 T; 307/93, 100

[56] References Cited

UNITED STATES PATENTS

| | | | |
|---|---|---|---|
| 3,048,718 | 8/1962 | Starzec | 323/22TX |
| 3,303,386 | 2/1967 | Murphy | 317/31 |
| 3,426,265 | 2/1969 | Till | 317/33X |

*Primary Examiner*—J. D. Miller
*Assistant Examiner*—Harvey Fendelman
*Attorneys*—Curtis, Morris and Safford, William J. Keating, Ronald D. Grefe, William Hintze, Adrian J. La Rue, Frederick W. Raring, Jay L. Seitchik and John P. Vandenburg

ABSTRACT: A combined overload and overvoltage protective circuit for solid state devices which utilizes two transistors in a NOR logic gate configuration that is held normally off by a common emitter bias supplied through a feedback current developed from voltage supplied to a load. Either transistor is switched on to shunt supply current away from solid state devices of the circuit during an overload or input overvoltage condition.

In case of overload, excessive load current causes the development of an increased drop across the base-emitter circuit of one transistor countering the hold off bias developed from the feedback current.

An input overvoltage causes a Zener diode to conduct and to develop an increased drop across base-emitter of other transistor countering the same hold off bias developed from the feedback current.

INVENTOR
JAMES PETER TILL

BY JOHN P. VANDENBURG

OVERCURRENT AND OVERVOLTAGE PROTECTION CIRCUIT FOR A VOLTAGE REGULATOR

BACKGROUND OF THE INVENTION

One of the problems incident to the expanding use of transistors and other solid state elements in power supplies, voltage regulators and the like is providing protection against abnormal, but expected input voltage, load and circuit conditions which may damage or destroy such elements. Typical problem conditions include input voltage transients, current overloads, input overvoltage, circuit or load short circuits and capacitive loads. The failure mode of transistorlike elements is one of constituent breakdown caused by either excessive heat in turn caused by load conditions relative to the dissipation rating of the element or by excessive voltage across the element in turn caused by input overvoltage relative to the maximum voltage rating of the element. This problem is particularly evident in transistorlike devices because of the relatively high speed of operation and therefore the rapid development of overload and input overvoltage conditions. Most fuses or circuit breakers are far too slow for effective use with transistorlike switching speeds. This means that by the time the fuse or breaker of use has opened the circuit the solid state element requiring protection has already been seriously damaged or destroyed by currents and voltages far in excess of the element dissipation or voltage ratings. Furthermore, many circuit conditions arise which must be protected against without shutting down circuit operation completely or requiring restarting maneuvers.

A simple but crude solution employed by the prior art for overload protection is to provide series resistance. This is inefficient and also adversely affects circuit performance under normal conditions. An alternative approach widely used in the prior art is to overdesign the circuit so as to accommodate most abnormal conditions by employing elements effectively derated relative to the working requirements of the circuits. This is both costly and inefficient.

Some work has been done in developing adjustable current limiting protective circuits with minimized degradation of circuit function and with features of automatic return following cessation of abnormal conditions. Examples of such appear in the literature and several are given in the RCA House Publication, "Application Note," SMA–18 by H. T. Breece III, dated June 1963. This publication also includes a bibliography listing several further alternative approaches. These prior art circuits all operate to cut back output voltage while holding output currents substantially constant or at least to a value which is a small percentage above the current required for normal operation. By and large these devices use two or more transistors, several diodes as well as supporting resistors and a proportionately complicated circuit.

A simple but highly dissipative scheme used in the prior art for overvoltage protection is to provide a silicon controlled rectifier connected in shunt across the input to the transistor regulator circuit, the silicon controlled rectifier being biased ON in the event of an overvoltage by means of a resistive divider network. This protection scheme is commonly known as a "crowbar" circuit. One main disadvantage of this scheme is that it is not capable of automatic return of the regulator to normal operation upon removal of overvoltage. Once the controlled rectifier is triggered into conduction, it will remain conducting unless complex turn off or commutation circuitry is provided. Another disadvantage of the "crowbar" scheme is that it requires considerable overdesign of input circuit (input rectifiers and transformer) so as to accommodate the very high shunt current drawn when the controlled rectifier is conducting. This tends either to make the input supply section highly dissipative and/or to increase its physical size, resulting in increases in the amount of heat generated within the power supply package and in its volume.

There has been disclosed in applicant's prior U.S. Pat. No. 3,426,265 an overload protective circuit for solid state devices, but the said circuit is arranged to protect only against overcurrent short circuit conditions without any provision for protecting these solid state devices against the effects of input overvoltage conditions.

SUMMARY OF THE INVENTION

This invention relates to a circuit for protecting electronic devices from both overload and input overvoltage conditions.

The present invention has as one object the provision of a combined overload and overvoltage protective circuit which has fewer parts and greater reliability than prior art devices. Another object is to provide a combined protective circuit having an improved function with respect to cutback of both voltage and current in the event of overload conditions and cutoff of both voltage and current in event of overvoltage conditions. It is still a further object to provide a combined protective circuit which may be easily adjusted, has automatic return and minimizes abnormal fault power requirements for the circuit in use.

The foregoing problems are overcome and the invention objectives are attained in a circuit which in terms of hardware can be embodied in two transistors or an IC NOR Gate, one Zener diode and five resistors having a response characteristic approaching that of the protected solid state devices of use; all simply connected and driven by voltages and currents present in the circuit of use. The technique of the invention is to employ a relatively fast switching solid state device in a mode of operation which shunts current away from the current driving solid state devices of the circuit of use only during abnormal conditions of overload and/or overvoltage. Shunting effect is controlled as to initiation and as to degree and it is further made adjustable in terms of permitted percentages of overload or overvoltage in the circuit. During normal conditions the invention circuit is practically passive, drawing little power and essentially out of the circuit of use with respect to its effect on circuit function.

In the description hereinafter to follow the invention circuit will be detailed relative to its use in a specific transistor voltage regulator circuit. It is contemplated, however, that the circuit of the invention may be employed in numerous other regulator applications and in still other power supply circuits having a requirement for solid state element protection, and it is believed that such additional uses will be apparent to those skilled in the art from the description hereinafter to follow.

DESCRIPTION OF THE PREFERRED EMBODIMENT

Figure 1:
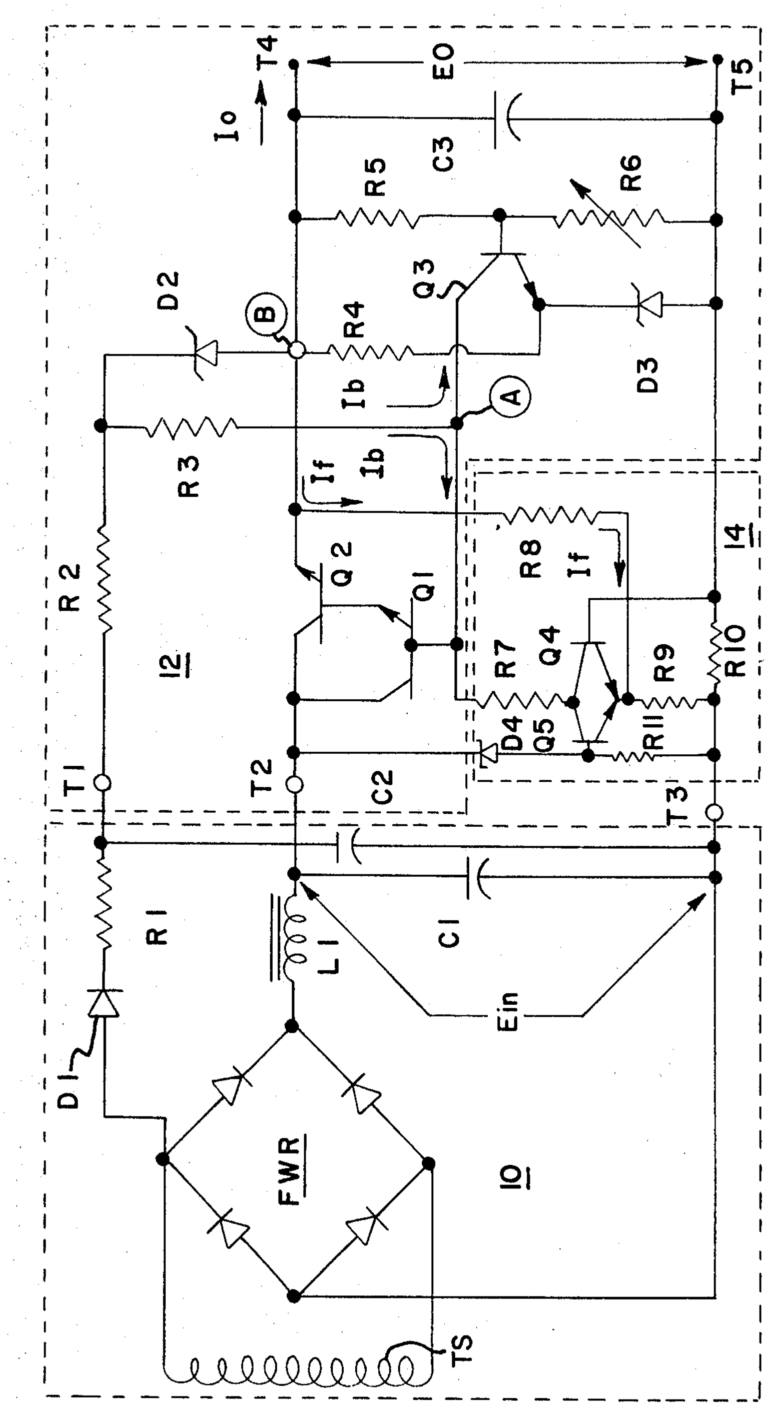
FIG. 1 is a schematic diagram showing a typical circuit having solid state elements requiring protection along with the circuit of the invention.

Referring now to FIG. 1, the circuit shown represents a transistorized low voltage, high current series regulator having a capability to regulate a DC supply level of approximately 30 to 50 volts to 28 volts ±½ percent through a current range of from 0.0 to 1.0 ampere. The problem with circuits of this type is to protect the transistor type devices from damage or destruction during abnormal circuit conditions which are caused by overloads and overvoltages and which may be expected in any practical working electronic system. As one of the solutions of the prior art, the various transistors of this circuit would be made to have capacities expressed in terms of dissipation rating four or five times that required to handle the voltage-current parameters specified above. This would mean that the elements would be four or five times as costly as required by the normal operating conditions of the circuit and additionally would be driven to operate during normal conditions in portions of their operating characteristic curves, which are inefficient and distorting.

In FIG. 1 the block labeled 10 contains the DC level input circuit, the block labeled 12 represents the regulator circuit, the block labeled 14 represents the circuit of the invention and the load may be considered as across the output terminals T–4, T–5 driven from these various circuits. The DC input 10 is comprised of a transformer secondary TS connected to a full-wave diode rectifier FWR connected to drive the regulator circuit 12 through the three leads connected to input terminals T–1, T–2, and T–3. In the connection to T–1, commoned with the upper input to FWR is provided a diode D–1 and a relatively small value resistor R–1 which serves to provide a limited and constant bias current $I_b$ to 12. An inductance L–1 is provided in one leg of the output from FWR to T–2 with a capacitor C–1 placed across the leads to terminals T–2 and T–3 to filter the rectified DC level voltage source. A further capacitor C–2 is provided across the leads to terminals T–1 and T–3 to filter the rectified DC bias voltage source. The leads T–1 and T–3 operate then to supply 12 with a DC bias input and the circuit 10 is thus merely to convert an AC supply from TS into a DC level at T–2 and T–3 for powering circuit 12. The circuit 12 has as its function the regulation of this level to provide a constant output or load voltage $E_o$ with variations of load current $I_o$.

Considering now the circuit 12, the lead through T–1 serves to provide a constant bias current $I_b$ to the circuit by means of resistor R–2, a Zener diode D–2, and a resistor R–3 adjusted in value to provide a current limited input to the base of a transistor Q–1 sufficient to cause such to conduct, which in turn causes a transistor Q–2 to conduct. The collector of Q–1 is tied to the lead from T–2 in parallel with the collector to Q–2, which has its emitter in series with such lead which provides one output lead to the load; i.e. to T–4. This provides Darlington type amplification of the input from T–2. The bias current $I_b$ from R–2 and R–3 is also supplied to the collector of an error amplifier, transistor Q–3, which has its base tied to a resistive divider network, R–5, R–6, across the load. The emitter of Q–3 is tied to a reference voltage supply consisting of a resistor R–4 and a Zener diode D–3 and attached across the output leads. Thus, any changes in output voltage are compared at base of error amplifier transistor Q–3 to a constant reference voltage at Q–3 emitter. The amplifier in turn conducts a collector current from point A proportional to the output voltage change. The base Q–3 is tied through resistor R–5 to the output from Q–2, to the load via terminal T–4 and to the other load lead via T–5 through a variable resistor R–6, which may be adjusted to control the conduction point of Q–3 relative to the reference voltage of D–3. For a given setting of R–6, Q–3 controls the voltage across Q–2 and load operating voltages. The resistor R–5 is made to have a value so that Q–3 is conducting when Q–2 is conducting.

The bias current $T_b$ flowing into point A is thus divided or split to be shared by the base of Q–1 and the collector of Q–3. Considering now normal variations in operation of the circuit, as for example from an increase in the impedance of the load, the circuit of 12 operates as follows. With an increase in load impedance, $I_o$ will decrease to increase $E_o$ and the base to emitter voltage across Q–3. This will cause Q–3 to draw more current $I_b$. Since Q–3, Q–1 and Q–2 are all supplied from point A by $I_b$, Q–1 and Q–2 will draw less current and effectively and proportionally reduce the voltage $E_o$ applied to the load to hold such constant. Thus any tendency of the load to raise the load voltage output will be countered by an increase in current drawn by Q–3 and a decrease in current drawn by Q–1, Q–2 to reestablish the voltage output to the load. Assuming a decrease in impedance in the load, which would tend to increase $I_0$ and reduce $E_0$, a reverse operation will occur to result in a drop in the base emitter voltage Q–3. This will result in Q–3 drawing less current from point A and Q–1, Q–2 drawing more current to effectively counteract any net drop in $E_o$. The resistor R–6 which serves to limit the base current to Q–3 is made adjustable to adjust the base current of Q–3 and thus the base to emitter drop and establish limits for normal circuit operation.

The foregoing presents the operation of the circuit of 12 to provide voltage regulation. The circuit 14, as shown in FIG. 1, is connected to the circuit point A, to point B, to the lead from terminal T–2, and to the other load lead proximate input terminal T–3. This circuit includes transistors Q–4 and Q–5 having response and other characteristics similar to the transistors Q–1, Q–2 and Q–3, which are protected by 14. The collector-emitter paths of transistors Q–4 and Q–5 are in parallel with each other and each is effectively connected in series between A and T–3 with resistors R–7 and R–9. The resistances R–8 and R–9 are chosen so that Q–4 and Q–5 are off during normal circuit operation to draw no current from point A and thus not affect either the function of the regulator circuit or its power requirement.

The emitters of Q–4 and Q–5 are both tied to lead T–3 by the resistor R–9. The connection from point B of the circuit to the common emitters of Q–4 and Q–5 may be considered to carry a feedback current $I_f$ of quantity determined by regulated voltage and values of R–8 and R–9. The overload protection section consists of transistor Q–4 whose base is tied directly to output lead T–5 and overload sensing resistor R–10. R–9 is effectively separated by resistor R–10, which serves to establish the drop across the emitter-base path of Q–4. In normal operation, $I_f$ will flow from the positive regulated DC output, and through R–9 to establish an emitter voltage for Q–4. At or near the lower limit of normal load current the voltage across R–10, which determines the base voltage of Q–4, will be either zero or a very small value and Q–4 will be back-biased by the emitter voltage due to the presence of $I_f$ and will remain off. As the load current increases from or near zero to its upper normal limit, the drop across R–10 will increase proportionately to approach the drop across R–9 but Q–4 will still remain off.

Figure 2:
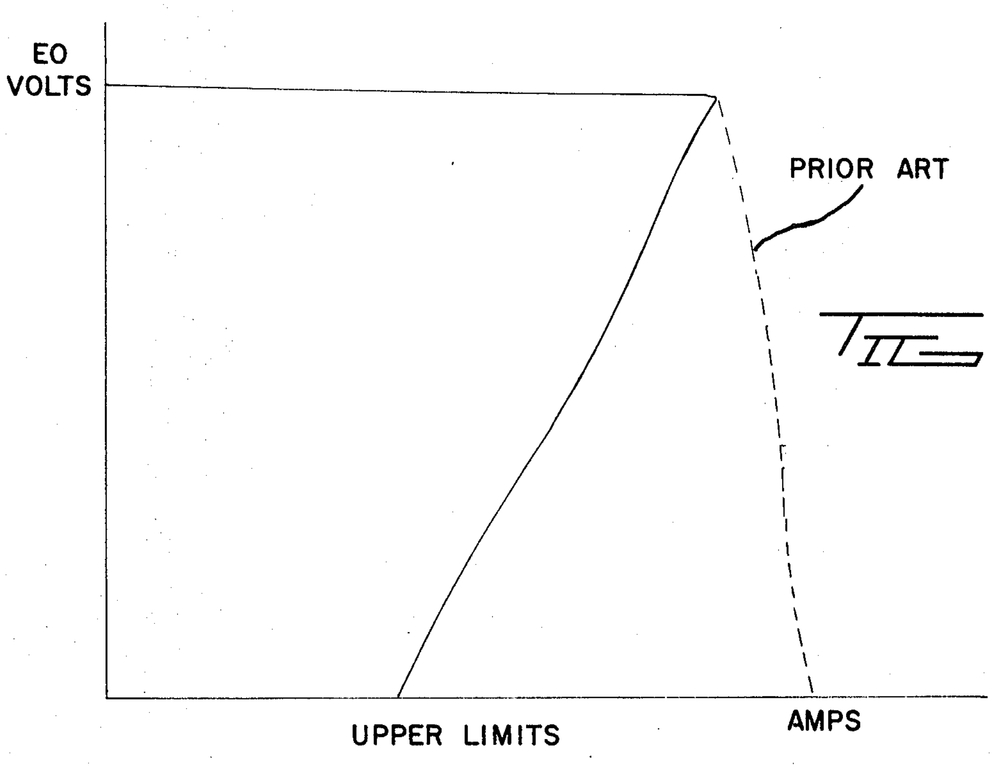
FIG. 2 is an output voltage-current plot showing the operating overload characteristics of the invention as compared with prior art devices.

Considering now that an overload condition occurs and that the load current exceeds the upper limit as set by the various parameters of the circuit so that the drop across R–10 exceeds the drop across R–9, the base of Q–4 will become relatively positively biased to cause Q–4 to conduct. When Q–4 conducts some portion of $I_b$ will be drawn from point A to reduce the bias current supplied to the base of Q–1 and thereby increase the voltage drop across Q–1, Q–2. Now, these conditions will have been caused by a reduction in the load impedance which causes an increase in the load current $I_o$. FIG. 2 shows this operation plotted in terms of output voltage $E_o$ and load current $I_o$ with the upper limit as shown. As the $I_o$ exceeds this upper limit and $E_o$ drops slightly to cause Q–3 to draw less current there will be a further increase in the load current due to the increased current $I_b$ supplied from A to Q–1, Q–2. When this occurs the current $I_f$ from point B in the circuit will be relatively reduced to reduce the voltage drop across R–9, and Q–4 will be further biased into conduction and draw more current from point A in a regenerative manner. This will further cut down the current supplied to Q–1, Q–2 and decrease the output voltage $E_o$ to a point of stabilization. This is shown in FIG. 2 by the trace of $E_o$ plotted against $I_o$ in its characteristic folding back to a substantially reduced level at zero output voltage or dead short condition. This is contrasted by the dotted line to the right of the curve, which represents the typical operation of the prior art.

In summary, on overload or overcurrent there is at first a slight increase in load current and then a reduction which is substantial with a reduction of output voltage. In this manner the various transistors Q–1, Q–2 and Q–3 are protected against excessive currents and heating and the incidental damage or destruction caused thereby. If normal load conditions are restored the circuit will provide an automatic return to normal operation. As soon as the drop across R–10 is reduced below that of the drop across R–9, Q–4 will cease conducting and will be effectively removed from the circuit.

If R–8 is made variable the overload level can be adjusted as desired.

In the overvoltage protection section the base of transistor Q–5 is tied to the common point of Zener diode D–4 and resistor R–11 comprising the overvoltage sensing network. R–11 effectively separated by resistor R–9 establishes the drop across the base-emitter path of Q–5. In normal operation, the emitter voltage for Q–5 is established by flow of $I_f$ from regulated DC output through R–9. At or near the lower limit of normal input voltage Ein, from section 10 the voltage across R–11, which is determined by Zener diode D–4 current flow, will be zero or very small and Q–5 will be back-biased by the emitter voltage due to the presence of $I_f$, and will remain off. As the input voltage increases to its upper normal limit, the drop across R–11 will remain relatively small due to low current flow since D–4 is below its Zener voltage level.

Considering now that an overvoltage condition occurs and that the input voltage exceeds the upper limit as determined primarily by the Zener voltage rating of diode D–4, then the drop across R–11, caused by an instantaneous increase of Zener current, exceeds the drop across R–9. The base of Q–5 will rapidly become positively biased causing Q–5 to conduct heavily. When Q–5 conducts a large portion of $I_b$ from point A it effectively eliminates bias current supplied to the base of Q–1, thereby rendering Q–1 and Q–2 nonconducting and driving the regulated output to zero. This essentially protects Q–1 and Q–2 from excessive dissipation during overvoltage condition by placing full voltage at no current across them (Q–1—Q–2) as opposed to a condition of maximum input voltage less regulated output voltage at load current without protection means.

Figure 3:
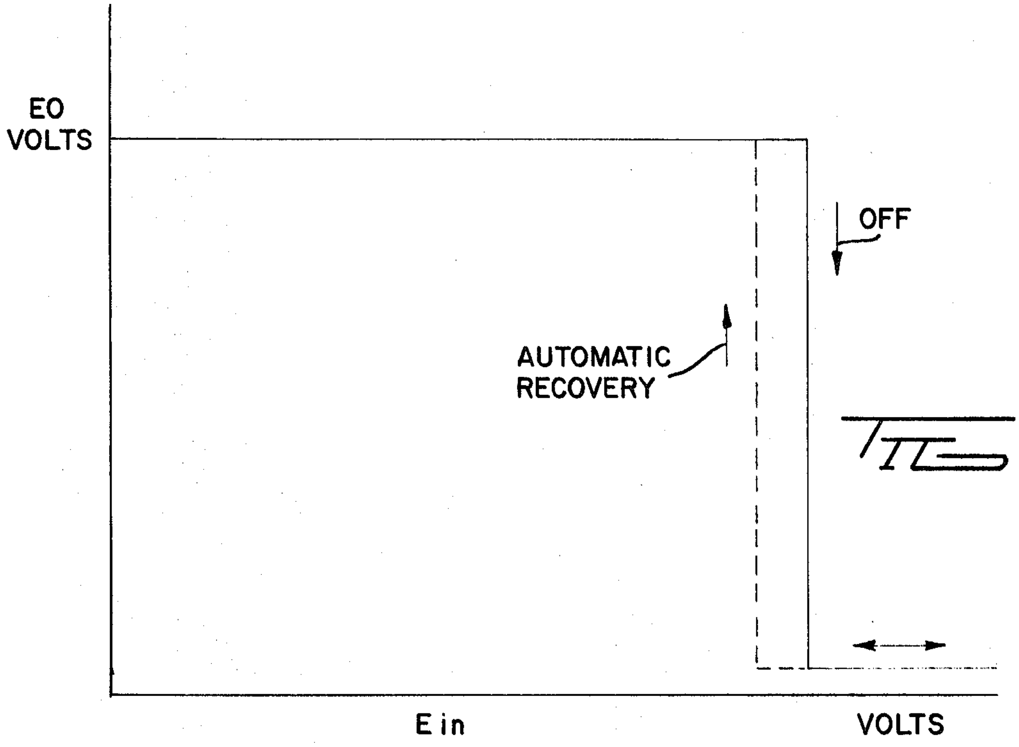
FIG. 3 is an output voltage-input voltage plot showing the operating overvoltage characteristics of the invention.

Automatic recovery to normal operation occurs when input voltage drops slightly below Zener voltage rating of D–4. At this point Zener current reduces drop across R–11 below that of R–9, whereupon Q–5 will cease conducting and will be effectively removed from the circuit. The response of the present combined protective circuit during both turn off and automatic recovery is shown in FIG. 3 by the trace of $E_o$ plotted against Ein.

It should be apparent that other circuit conditions resulting in current and voltage surges will also operate to cause circuit 14 to become effective.

In an actual circuit constructed in accordance with the invention the elements shown in FIG. 1 were as follows:

Q–1—N697 (GE)
Q–2—N1488 (RCA)
Q–3—N697 (GE)
Q–4—N697 (GE)
Q–5—N697 (GE)
D–1—IN485B (TI)
D–2—Zener 6.2 Volts
D–3—Zener 6.2 Volts
D–4—Zener 33 Volts
R–1—Ω
R–2—Ω
R–3—Ω
R–4—Ω
R–5—Ω
R–6—Ω
R–7—Ω
R–8—Ω
R–9—Ω
R–10—Ω
R–11—Ω
C–1—mf.
C–2—mf.
C–3—mf.

Having described my invention in a mode intended as a preferred mode of practice, I now define it through the appended claims.

What I claim is:

1. In a voltage regulated power supply, a current source connected to an amplifying transistor in turn connected to a load, a first voltage divider comprising a control transistor including a first Zener diode connected to said amplifying transistor and to said load to regulate load voltage during normal input voltage and load conditions, a fast-acting combined overload and overvoltage protective circuit means comprising a first switching transistor and a second switching transistor connected in parallel and connected to said current source, a second voltage divider comprising a bias circuit connected directly between the output of said amplifying transistor and the emitters of said first and second switching transistors to develop a feedback current sample of output current to bias both of said switching transistors off during normal input voltage and load conditions independently of the operation of said control transistor and said first Zener diode to regulate a load voltage, a resistor connected in a load current return path to develop a voltage drop causing said first switching transistor to conduct during overload conditions and draw bias current from said amplifying transistor to cut back load current, the said bias circuit then operating in response to the reduction in load current to reduce the effective bias to said first switching transistor so as to permit said first switching transistor to remain on until normal load conditions are reestablished, and overvoltage sensing network means connected across said current source and to said second switching transistor, said network means including a second Zener diode and a further resistor connected thereto to develop a voltage drop causing said second switching transistor to conduct during input overvoltage conditions and draw bias current away from said amplifying transistor sufficient to render the said amplifying transistor nonconducting and to reduce the regulated output to zero, thereby protecting the components of said power supply from excessive dissipation, said second switching transistor remaining on until normal input voltage conditions are reestablished.

2. The voltage regulated power supply of claim 1, further comprising a third Zener diode connected in series between said current source and the junction of said amplifying transistor and said load.

3. The voltage regulated power supply of claim 1, wherein said bias circuit includes a substantially linear resistance path.

4. In a voltage regulated power supply, a current source connected to an amplifying transistor in turn connected to a load, a first voltage divider comprising a control transistor including a first Zener diode connected to said amplifying transistor and to said load to regulate load voltage during normal input voltage and load conditions, a fast-acting protective circuit means comprising at least a pair of switching transistors connected together in parallel and connected to said current source, a second voltage divider comprising bias circuit means connected between the output of said amplifying transistor and the emitters of said switching transistors to develop a feedback current sample of output current to bias said switching transistors off during normal input voltage and load conditions independently of the operation of said control transistor and said first Zener diode to regulate a load voltage, resistance means connected in a load current return path for developing a voltage drop causing one of said switching transistors to conduct during overload conditions and draw sufficient bias current away from said amplifying transistor to cut back load current, said one switching transistor being maintained on until normal load conditions are reestablished, a second Zener diode connected to said current source and further resistance means connected to said second Zener diode for developing a voltage drop causing another of said switching transistors to conduct during input overvoltage conditions and draw sufficient bias current away from said amplifying transistor to render it nonconducting and thus reduce the regulated output to zero, said another switching transistor being maintained on until normal input voltage conditions are reestablished.

5. The voltage regulated power supply of claim 4, further comprising a third Zener diode connected in series between said current source and the junction of said amplifying transistor and said load.

6. The voltage regulated power supply of claim 4, wherein said bias circuit means includes a substantially linear resistance path.